Figure 1:
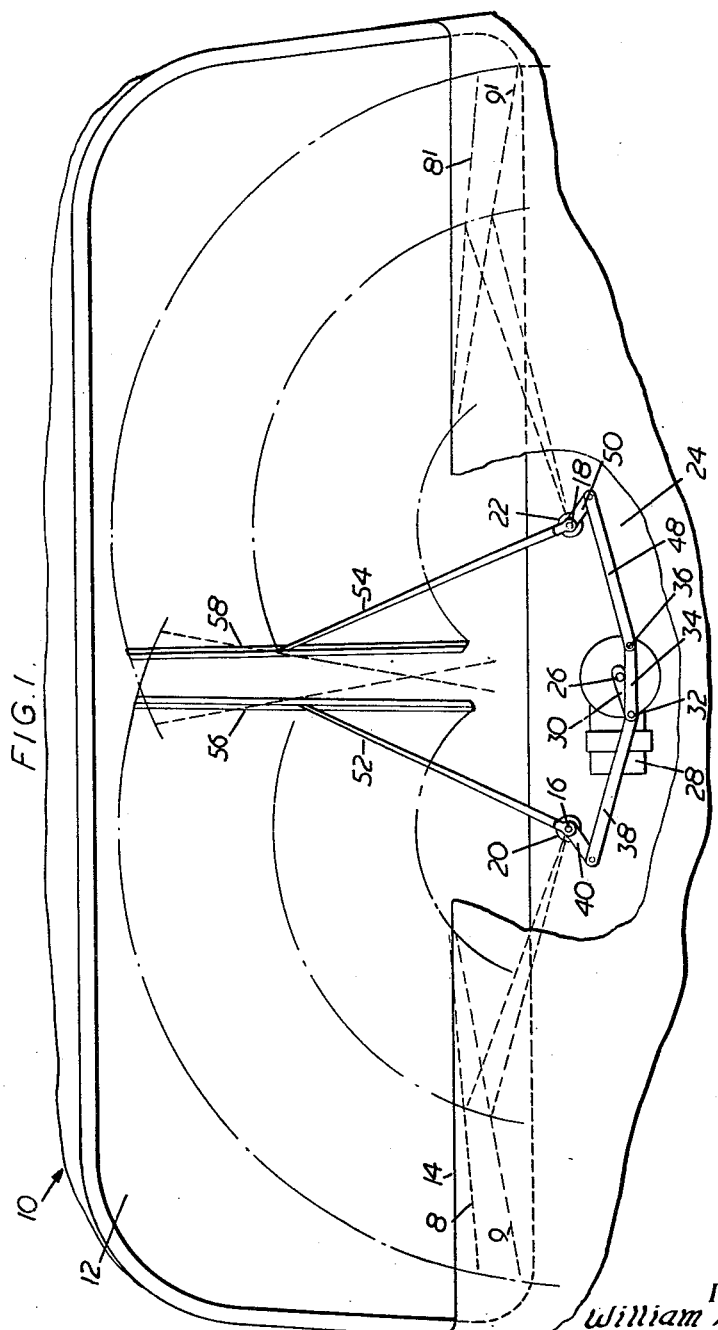

Oct. 30, 1962  W. E. SIMPSON ETAL  3,060,479
VEHICLE WINDSCREEN WIPER SYSTEMS

Filed Jan. 7, 1960  2 Sheets-Sheet 1

Inventors
*William E. Simpson*
*Derek N. Stevens*
By
*W. E. Finley*
Attorney

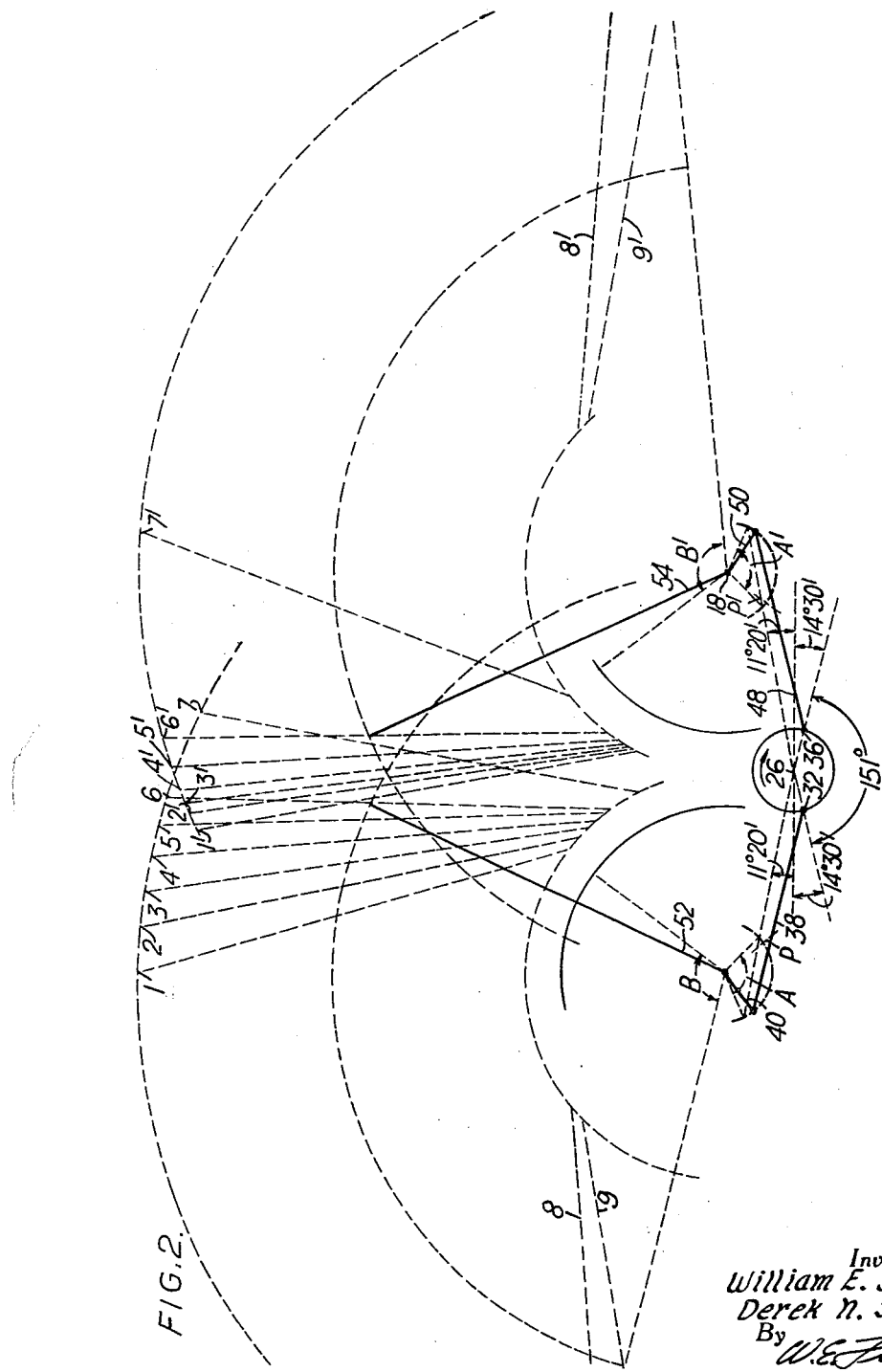

United States Patent Office 3,060,479
Patented Oct. 30, 1962

3,060,479
VEHICLE WINDSCREEN WIPER SYSTEMS
William Edward Simpson, Mill Hill, and Derek Norman Stevens, Dunstable, England, assignors to General Motors Corporation, Detroit, Mich., a corporation of Delaware
Filed Jan. 7, 1960, Ser. No. 974
Claims priority, application Great Britain Jan. 17, 1959
11 Claims. (Cl. 15—250.14)

This invention relates to vehicle windscreen wiper systems having a pair of wiper arm and blade assemblies. The invention is applicable in particular to such windscreen wiper systems in which the assemblies are driven through the intermediary of simple crank and lever mechanisms, but is also applicable to windscreen wiper systems with other forms of drive mechanism.

In such windscreen wiper systems the pair of wiper arm and blade assemblies are customarily arranged for operation in one or the other of two different ways; in one the wiper arms move in parallel about pivot points which lie adjacent one horizontal edge of the windscreen; in the other the wiper arms move in opposite senses, that is, 180° out of phase, and are pivoted about points which lie adjacent opposite ends of one horizontal edge of the windscreen.

With either method of operation it is now common to arrange that the wiper arms and blades shall terminate their movement in one direction adjacent the one edge of the windscreen, this enabling the assemblies to be parked automatically in an unobtrusive position without the necessity for additional expensive and complicated mechanism for "off-screen" parking of the assemblies. As it is not easy without additional complication of the mechanism to obtain an arc of movement of the assemblies much greater than 120°, the path of movement of each assembly customarily extends from a position adjacent said one edge of the windscreen to a position somewhat beyond the vertical.

The first method of operation, in which the wiper arms move in parallel, has the disadvantage that the two paths of movement of the assemblies overlap to a substantial extent over the portion of the windscreen at the driver's side of the vehicle, so that the wiped area of this portion is substantially greater than that of the portion of the windscreen at the passenger's side of the vehicle.

The other method of operation, in which the wiper arm and blade assemblies move in opposite senses, has the disadvantage that a substantial area of the central portion of the windscreen is not wiped by either blade.

By means of the present invention the aforesaid disadvantages can be avoided, and a great proportion of the area of the windscreen be wiped, by moving the wiper arm and blade assemblies out of phase with each other.

From one aspect, the invention is a windscreen wiper system having a pair of wiper arm and blade assemblies which are adapted to be oscillated over a vehicle windscreen throughout partially overlapping paths, and out of phase by a fraction of a stroke, between 90° and 180°, such that the wiper arm and blade assemblies will not come into contact with each other during oscillation throughout the overlapping portions of their paths.

The amount by which the assemblies are out of phase is preferably such that, at positions of the assemblies near the ends of their respective paths adjacent a horizontal edge of the windscreen, the assemblies will be substantially symmetrically disposed with the blades in approximately horizontal positions which constitute the parked positions of the assemblies.

Preferably the pair of wiper arm and blade assemblies are respectively secured on one and the other of a pair of pivot shafts each of which carries an oscillatory crank respectively linked to one and the other of a pair of rotary cranks driven by a common drive shaft.

Thus, from another aspect, the invention is a windscreen wiper system comprising a rotary drive shaft carrying a pair of cranks respectively linked to one and the other of a pair of oscillatory cranks arranged to oscillate a pair of wiper pivot shafts respectively adapted to carry one and the other of a pair of wiper arm and blade assemblies, the paths of movement of which will partially overlap over a central portion of the windscreen, the cranks and links being arranged so that the wiper arm and blade assemblies will oscillate out of phase by an amount, between 90° and 180°, such that the wiper arm and blade assemblies will not come into contact with each other during their movement over the overlapping portion of their paths.

Preferably the cranks are arranged so that the wiper blades can each be parked in a substantially horizontal position adjacent the lower edge of the windscreen, near the end of the path of movement of each assembly in one direction.

In one construction according to the invention the cranks are arranged adjacent the windscreen and below the level of the scuttle of the vehicle on which the windscreen is mounted; and the ends of the paths of movement of the assemblies towards each side of the windscreen lie below the scuttle level. By such an arrangement the wiper arms can have a greater radius than is customary when the wiper arms are pivoted adjacent the windscreen substantially at the level of the scuttle, and the paths of movement of the wiper blade and arm assemblies will be throughout flatter arcs enabling a greater proportion of the area of the windscreen to be effectively wiped.

Conveniently, the windscreen extends downwardly below the level of the scuttle, the wiper arm and blade assemblies operating through a gap between the scuttle and windscreen.

The scope of the invention is defined by the appended claims; and the invention and the method by which it is to be performed are hereinafter particularly described with reference to the accompanying drawings of one preferred embodiment of the invention in which:

FIGURE 1 is a front elevation of part of a motor vehicle equipped with a windscreen wiper system according to the invention; and FIGURE 2 is a diagrammatic view of the windscreen wiper system shown in FIGURE 1.

FIGURE 1 shows part of a motor vehicle 10 having a windscreen 12 the lower edge of which lies below the level of the scuttle or cowl 14, there being a gap between the rear edge of the scuttle 14 and the windscreen 12.

A pair of wiper pivot shafts 16 and 18 journalled in bearings 20, 22 secured to a bulkhead 24 are arranged respectively to the left hand and the right hand side of the centre line of the vehicle, as viewed in the drawing, and adjacent the lower edge of the windscreen 12, below the level of the scuttle 14, the pivot shafts 16, 18 lying one to either side of a centrally arranged rotary drive shaft 26 adapted to be driven by an electric windscreen wiper motor 28 fixed on the bulkhead 24.

To the drive shaft 26 is secured a pair of rotary cranks in the form of a double throw crank arm and crank pin assembly comprising a first crank arm 30 secured at one end on the drive shaft 26 and carrying at its other end a crank pin 32 to which is secured one end of a second crank arm 34, the other end of which carries a crank pin 36. Pivotally mounted on the crank pin 32 between the crank arms 30 and 34 is one end of a link 38, the other end of which is pivotally connected to one end of a drive arm 40 secured on the wiper pivot shaft 16.

A similar link 48 is pivotally mounted at one end on the crank pin 36 and at its other end is pivotally connected to a drive arm 50 secured on the wiper pivot shaft 18. A pair of wiper arms 52, 54 are secured respectively on the wiper pivot shafts 16 and 18 and a pair of wiper blades 56 and 58 are mounted respectively on the ends of the wiper arms 52, 54.

The two crank pins 32 and 36 are angularly spaced by 151°, and in the preferred embodiment illustrated (which is not to scale) the centre of the drive shaft 26 is 1⅞ in. below the centres of the pivot shafts 16, 18, the distance between the centre of each of the pivot shafts 16, 18 and the centre of the drive shaft 26 being 5½ in. Each of the wiper arms 52, 54 is 10½ in. long and each of the blades 56, 58 is 12 in. long. The links 38 and 48 are 5½ in. in length and the drive arms 40 and 50 are 5⅚₁₆ in. in length and the distance between the centre of each of the crank pins 32, 36 and the drive shaft 26 is 1¹⁄₁₆ in.

The arrangement is such that on rotation of the drive shaft 26 the drive arms 40, 50 are oscillated throughout similar angles A, A' (FIGURE 2) but out of phase, the wiper arm and blade assemblies 52, 56 and 54, 58 accordingly being oscillated throughout similar angles B, B', but out of phase, upon rotation of the drive shaft 26. The wiper blades are substantially horizontal at the end of their outboard strokes, and substantially vertical at the end of their inboard strokes.

The amount by which the two wiper arm and blade assemblies are out of phase is such that at the end portion of the inboard stroke of each assembly each blade will overlap a portion of the path of the other, but the two blades 56, 58 will not come into contact with each other during such movement. Near the ends of the outboard strokes of the wiper arm and blade assemblies the two blades 56, 58 will be in symmetrical positions but moving in opposite senses respectively towards and away from the ends of their paths of oscillation.

In the embodiment described the amount of overlap of the paths of the blades 56, 58 at the centre of the windscreen is about 3 in. measured between the extreme ends of the blades 56, 58 at the ends of their respective inboard strokes.

FIGURE 2 shows diagrammatically the manner of operation of the windscreen wiper assembly described above, the wiper arm and blade assemblies 52, 56 and 54, 58 being shown in the positions which they occupy when the left hand wiper blade 56 is approaching the end of its inboard stroke and the right hand blade 58 has begun its outboard stroke.

The relative positions occupied by the wiper blades 56, 58 in the region of the overlapping portion of their respective paths of oscillation over the central portion of the windscreen 12 are respectively shown by the dotted lines numbered 1, 2, 3, 4, 5, 6, 7 and 1', 2', 3', 4', 5', 6', 7'.

It will be seen that at the position 1 the left hand wiper blade 56 is approaching the end portion of its inboard stroke but has not reached the overlapping portion of the paths of two blades, whereas the right hand blade 58 is at the same time moving away from the end of its inboard stroke at the position 1' and over the overlapping portion of the paths of the blades.

In its movement from position 1' to position 6' the right hand wiper blade 58 traverses practically the whole of the overlapping portion of the paths of the blades, whereas the left hand blade 56 in its corresponding movement from the position 1 to the position 6 has only just entered the overlapped portion of the paths of movement. The left hand blade 56 completes the end of its inboard stroke at the position 7, at which time the right hand wiper blade 58 will have moved to the position 7', well clear of the overlapping portion of the paths of the blades.

The parked positions of the wiper blades 56, 58 are shown at 8 and 8' respectively, and their positions at the ends of their outboard strokes (which are beyond their parked positions) at 9 and 9' respectively. It will be understood that, by reason of the out of phase movement of the two wiper arm and blade assemblies, the left hand blade 56 moves from its parked position 8 to its extreme outboard position 9 at the same time that the other blade 58 (having previously moved from its extreme outboard position 9' to its parked position 8') moves from its parked position 8' further towards its inboard position, and that when the wiper blades are at their parked positions 8, 8' they are symmetrically disposed and moving in similar senses, that is, similar directions of rotation.

As shown in FIGURE 2, when the crank pins 32, 36 are symmetrically disposed below the horizontal plane intersecting the shaft 26, a line drawn between each crank pin and the shaft 26 is at an angle of 14°30' to the horizontal; and a line passing through the two extreme positions of each of the drive arms 40, 50 and the shaft 26 makes an angle of 11°20' with the horizontal plane. The positions of the drive arms 40 and 50 in the parked positions 8 and 8' respectively of the wiper blades 56 and 58 are shown respectively at P and P'.

The wiper pivot shafts 16, 18 may in some cases have to be asymmetrically arranged relative to the drive shaft 26 but by appropriate modification of the linkage and the relative positions of one drive crank and the oscillatory crank on the respective drive shaft the same degree of out of phase relationship between the two wiper arm and blade assemblies may be retained.

By means of the arrangement described herein a substantial proportion of the area of the windscreen can be wiped, the wiped area extending in a relatively flat arc across substantially the full width of the windscreen; the portions of the windscreen on the driver's and the passenger's side of the vehicle are wiped to an equal extent, and the central portion of the windscreen wiped by both blades is relatively small.

The invention may also be applied to windscreen wiper systems in which the wiper arm pivot shafts are arranged so that the blades pivot from substantially vertical positions adjacent the sides of the windscreen to substantially horizontal positions adjacent a horizontal edge of the windscreen, the wiper arm and blade assemblies being oscillated out of phase so that they do not come into contact with each other throughout overlapping portions of their respective paths of movement over the central portion of the windscreen. Preferably in this case the arrangement of the rotary and oscillatory cranks is such that the amount by which the assemblies are out of phase is greater during their downward movement than during their upward movement throughout the overlapping portions of their paths; this is conveniently achieved by making one assembly move throughout a greater arc than the other.

We claim:

1. A vehicle windscreen wiper system comprising a pair of spaced oscillatable pivot shafts; a pair of wiper arm and blade assemblies comprising a wiper arm secured on each pivot shaft and a wiper blade carried by each wiper arm, said wiper blades being oscillated throughout strokes having overlapping paths, and drive mechanism connected to said pivot shafts so as to effect simultaneous oscillation of said wiper arm and blade assemblies out of phase by an amount, between 90° and 180°, such that the wiper blades do not come into contact with each other during movement throughout the overlapping paths of their strokes.

2. A windscreen wiper system according to claim 1, in which said wiper arm and blade assemblies move through similar angles between their inboard and outboard stroke ends.

3. A windscreen wiper system according to claim 1, wherein said drive mechanism includes a rotary double throw crank having angularly offset crank arms, a pair of links having their inner ends pivotally connected to said crank arms and a pair of drive arms connected to said pivot shafts and pivotally connected to the outer ends of said links whereby said wiper arm and blade assemblies are arranged for oscillation from substantially horizontal positions of the blades at the ends of their outboard strokes to substantially vertical positions at the end of their inboard strokes.

4. A vehicle windscreen wiper system comprising a pair of spaced oscillatable pivot shafts; a pair of wiper arm and blade assemblies comprising a wiper arm secured on each pivot shaft and a wiper blade carried by each wiper arm, said wiper blades being oscillatable throughout strokes having overlapping paths, and drive mechanism connected to said pivot shafts so as to effect simultaneous oscillation of said wiper arm and blade assemblies out of phase by an amount, between 90° and 180°, such that the wiper blades do not come into contact with each other during movement through out the overlapping paths of their strokes, and that at positions near the ends of their respective outboard strokes the wiper arm and blade assemblies will be substantially symmetrically disposed with the blades in substantially horizontal positions which constitute the parked positions of the assemblies.

5. A windscreen wiper system for a vehicle having a cowl and a windscreen, comprising a pair of spaced oscillatable pivot shafts; a pair of wiper arm and blade assemblies comprising a wiper arm secured on each pivot shaft and a wiper blade carried by each wiper arm, said wiper blades being oscillatable throughout strokes having overlapping paths over portions of said windscreen, drive mechanism connected to said pivot shafts so as to effect simultaneous oscillation of said wiper arm and blade assemblies out of phase a fraction of a stroke such that the wiper blades do not come into contact with each other during movement throughout the overlapping paths of their strokes, and that at positions shortly before the ends of their respective outboard strokes the wiper arm and blade assemblies will be substantially symmetrically disposed with the blades in substantially horizontal positions which constitute the parked positions of the assemblies.

6. A windscreen wiper system according to claim 5, in which said pivot shafts are arranged below the level of the cowl of the vehicle, said wiper arm and blade assemblies being arranged for oscillation through a gap between the cowl and the vehicle windscreen, and the ends of the outboard strokes of the blades lying below the level of the cowl.

7. A windscreen wiper system according to claim 5, in which said pivot shafts are arranged below the level of the cowl of the vehicle, the vehicle windscreen is arranged with its lower edge below the level of the cowl, and said wiper arm and blade assemblies are arranged for oscillation through a gap between the rear edge of the cowl and the windscreen, the wiper blades in the parked positions of the wiper arm and blade assemblies lying substantially at the level of the rear edge of the cowl.

8. A motor road vehicle windscreen wiper system comprising a windscreen the lower edge of which extends below the level of the cowl of the vehicle, the rear edge of said cowl being spaced from said windscreen so as to form a gap extending transversely of the vehicle; a pair of wiper pivot shafts arranged one to each side of the centre of the windscreen and below the lower edge thereof; a pair of wiper arm and blade assemblies each comprising a wiper arm secured on one of said pivot shafts for oscillation therewith, and a wiper blade mounted on the free end of the wiper arm; a pair of drive arms secured one on each said pivot shaft; a drive motor; a double crank assembly arranged for rotation by said motor and having a first crank arm and a second crank arm arranged at a fixed angle relative to the first crank arm; and a pair of links respectively connecting said drive arms to said crank arms, the arrangement of said wiper arm and blade assemblies, said drive arms, links and crank arms being such that on rotation of said crank arms said wiper arm and blade assemblies are simultaneously oscillated over the windscreen throughout strokes having extreme outboard positions in which the blades are substantially horizontal, and extreme inboard positions in which the blades are substantially vertical, and throughout paths which partially overlap towards the ends of the inboard strokes of the wiper arm and blade assemblies, and are out of phase by an amount such that the wiper arm and blade assemblies will not come into contact with each other during oscillation throughout the overlapping paths of their strokes, and will be symmetrically disposed adjacent the ends of their respective outboard strokes when in their parked positions.

9. A motor road vehicle windscreen wiper system comprising a windscreen the lower edge of which extends below the level of the cowl of the vehicle, the rear edge of said cowl being spaced from said windscreen so as to form a gap extending transversely of the vehicle; a pair of wiper pivot shafts arranged one to each side of the centre of the windscreen and below the lower edge thereof; a pair of wiper arm and blade assemblies each comprising a wiper arm secured on one of said pivot shafts for oscillation therewith, and a wiper blade mounted on the free end of the wiper arm; a pair of drive arms secured one on each said pivot shaft; a drive motor; a double crank assembly arranged for rotation by said motor and having a first crank arm and a second crank arm arranged at a fixed angle relative to the first crank arm; and a pair of links respectively connecting said drive arms to said crank arms, the arrangement of said wiper arm and blade assemblies, said drive arms, links and crank arms being such that on rotation of said crank arms said wiper arm and blade assemblies are simultaneously oscillated over the windscreen throughout strokes of equal angular extent from a substantially horizontal position of the blades at the end of their outboard strokes to substantially vertical positions at the ends of their inboard strokes, and through paths which partially overlap towards the ends of their respective inboard strokes, and that said wiper arm and blade assemblies are out of phase by an amount, between 90° and 180°, such that the wiper arm and blade assemblies will not come into contact with each other during oscillation throughout the overlapping paths of their strokes, and will be symmetrically disposed adjacent the ends of their outboard strokes in their parked positions.

10. A wiper system for a windscreen including, a pair of oscillatable wiper blades, said wiper blades being oscillatable through strokes having overlapping paths over a portion of said windscreen, and means for imparting simultaneous oscillation to said wiper blades in substantially phase opposition relation but a fraction of a stroke apart to preclude interference between said wiper blades throughout their overlapping paths.

11. A wiper system for a windscreen including, a pair of oscillatable wiper blades, said wiper blades being oscillatable through strokes having overlapping paths over a portion of said windscreen, drive mechanism positively interconnecting said wiper blades to position said wiper blades a fraction of a stroke apart, and motor means for actuating said drive mechanism for imparting simultaneous oscillation to said wiper blades in substantially phase opposition relation but having one wiper blade out of phase with the other wiper blade by said fraction of a stroke to preclude interference between said blades throughout their overlapping paths.

References Cited in the file of this patent

UNITED STATES PATENTS

| 2,810,294 | Latta et al. | Oct. 22, 1957 |
| 2,825,919 | Horton | Mar. 11, 1958 |

FOREIGN PATENTS

| 1,138,106 | France | Jan. 21, 1957 |
| 1,162,314 | France | Apr. 8, 1958 |